Aug. 7, 1962   P. H. NETHERWOOD ET AL   3,048,750
ELECTROSTATIC CAPACITOR
Filed Feb. 13, 1959

PAUL H. NETHERWOOD
LIVINGSTON L. RICE
*INVENTORS.*

BY *Connolly and Hutz*

THEIR ATTORNEYS

United States Patent Office 3,048,750
Patented Aug. 7, 1962

3,048,750
ELECTROSTATIC CAPACITOR
Paul H. Netherwood and Livingston L. Rice, Williamstown, Mass., assignors to Sprague Electric Company, North Adams, Mass., a corporation of Massachusetts
Filed Feb. 13, 1959, Ser. No. 793,185
4 Claims. (Cl. 317—258)

This invention relates to new and improved polarized electrostatic capacitors employing composite dielectrics, and more particularly to such capacitors which exhibit extended life under high voltage stress across the composite dielectric. This application is a continuation-in-part of our parent application SN 379,404 filed September 10, 1953, and later abandoned.

Electrostatic capacitors are limited in life by the physical and electrical properties of the dielectric material and the associated degradation which appears within the capacitor when subjected to long periods of use. Prior art attempts at extending the life of capacitors have included use of plastic films as the active dielectrics of the capacitor section in place of the conventional capacitor dielectric paper. Other capacitors have employed the use of complex dielectrics comprising two distinct resin films, or a film and a paper. While some of these constructions have met with appreciable success, they have not produced electrostatic capacitors having the degree of reliability of lifetime that is desired for modern day electronic devices.

One of the more successful capacitor constructions of the prior art employs a composite dielectric utilizing a layer of porous material such as paper and a layer of nonporous resin. This capacitor construction is rolled in a non-polar manner such that each electrode is contacted with one porous and one non-porous layer.

It is an object of this invention to produce an electrostatic capacitor having a lifetime greater than heretofore achieved by capaictors of the prior art.

It is another object of this invention to produce a polarized electrostatic capacitor employing a complex dielectric.

It is another object of this invention to produce a polarized capacitor that employs prior art composite dielectrics in a construction that greatly increases the life of the capacitor.

Figure 1:
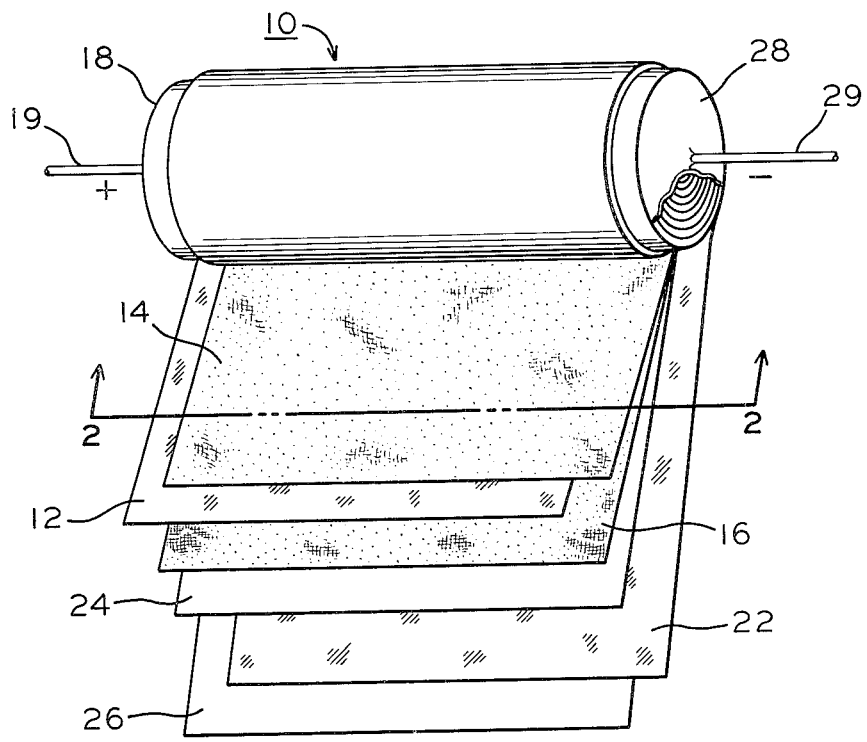
Figure 2:
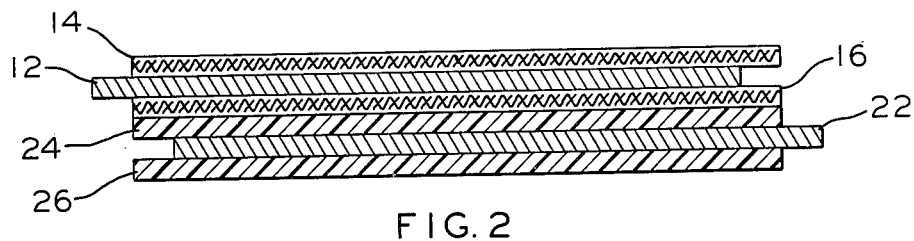

These and further objects of this invention will become more apparent upon consideration of the following description and claims, when read in conjunction with the accompanying drawing in which:

FIGURE 1 is a perspective view of a partially unrolled electrostatic capacitor employing a composite dielectric disposed in accordance with the teachings of this invention; and FIGURE 2 is a cross-section of the capacitor of this invention taken along line 2—2 in FIGURE 1.

In general, the objects of this invention are attained and the inventive concept is illustrated by a polarized electrostatic capacitor having a complex dielectric of such construction that the anode of the capacitor is operated in an area having lower electrical stress than the area that surrounds the cathode. That is, the composite dielectric is so constructed that the voltage gradient is such that the greater voltage is on the dielectric layer adjacent to the cathode.

In a restricted form of this invention, the objects are attained by an electrostatic capacitor having a composite dielectric in which the anode of the capacitor is surrounded by material of relatively low volume resistivity, and the cathode of the capacitor is surrounded by material of relatively high volume resistivity.

It is generally accepted in the art that degradation of an electrostatic capacitor takes place at the anode. This invention is based on the premise that the occurrence of this degradation can be greatly slowed (life of capacitor increase) by causing the greater part of the electrical stress to occur adjacent the cathode and spaced from the anode. Improved capacitors are fabricated according to this invention by causing the greater voltage gradient to occur at the cathode; thus, there is a lower voltage gradient adjacent to the anode with a resulting decrease in degradation. This invention provides a means for placing minimum stress in the area of the anode by utilizing (in the anode area) a dielectric which has low insulation resistance or is "lossie" in comparison with the dielectric material in contact with the cathode. In this way higher stress is placed across the material with the higher insulation resistance or volume resistivity.

FIGURE 1 shows a capacitor section 10 that is partially unrolled to reveal composite dielectric layers 14, 26 and 16, 24 that separate electrode foils 12 and 22. Capacitor section 10 is rolled in non-inductive (extended-foil) fashion with foil 12 extending from one end of the roll and foil 22 extending from the other end of the roll. The extending ends of foil 12 are provided with a terminal lead 19 secured by solder 18. In a like manner, terminal lead 29 is secured to the extending ends of foil 22 by solder 28. A suitable marking such as a plus sign is positioned adjacent terminal 19 to indicate the prescribed orientation for capacitor section 10 in an electronic circuit in order to obtain the benefits of the inventive construction. As a further precaution to ensure proper connection of capacitance section 10 in a circuit, a suitable marking such as a minus sign may be made on the capacitor adjacent to terminal 29. In this construction cathode foil 22 is rolled as the outside foil in section 10 to gain the shielding effect offered by connecting the outside foil of a capacitor to the low potential or chassis side of a circuit. It should be understood however that anode foil 12 may be rolled as the outside foil whenever circuit advantages are to be gained thereby.

FIGURE 2 is a cross-section taken along the unrolled portion of capacitor section 10 as shown in perspective in FIGURE 1. The various layers of section 10 are shown in greatly exaggerated manner in FIGURE 2 for the sake of clarity of understanding of the relative position and construction of the various layers that make up section 10. Although it is not intended that any dimensional limitations be read into FIGURE 2, it is believed that the relative widths of the constituent layers of dielectric and electrode materials may be readily comprehended from this illustration. Thus, it is seen that dielectric layers 14, 16, 24 and 26 are of substantially uniform width and are rolled in section 10 in substantial alignnment. FIGURE 2 also shows that electrodes 12 and 22 are of substantially equal width and are positioned in capacitor section 10 with electrode 12 extending from one end of the section and electrode 22 extending from the other end of the section. Since the electrodes are of substantially equal width, the extention of an electrode from one end of the section leaves a void at the other end of the section which results in increased margins to protect against shorting of the two electrodes when solder is utilized to apply terminal leads to the extended portion of the foils.

Composite dielectric 16, 24 is between one pair of opposed surfaces of electrodes 12 and 22, and composite dielectric 14, 26 is between the other pair of opposed surfaces of foils 12 and 22. It is important to note that the advantages of this invention are gained by loading the rolling machine so that the order of the constituent layers is reversed in the two composite dielectrics. The reversal in the order of the constituent layers of the composite dielectrics permits like material to be on each side of each electrode. In other words, electrode 12 is between layers 14 and 16 which are of like material of one volume resistivity, and electrode 22 is between layers 24 and 26 which are of like material of a different volume resistivity. In the construction shown in the drawing electrode 12 is indicated as the anode electrode; hence, is between layers of the relatively low volume resistivity material as compared to dielectric layers 24 and 26 which surround electrode 22, and which are of relatively high volume resistivity material.

While the composite dielectrics are each shown as comprising only two layers of material, it should be understood that each composite dielectric may comprise any number of layers so long as the layers adjacent the anode are of lower resistivity material than the layers adjacent the cathode. For example, in a composite dielectric made up of two layers of paper and two layers of Mylar, the two layers of paper would be together and would be adjacent the anode, and the two layers of Mylar would be together and would be adjacent the cathode. Then a similar four layer composite dielectric would be positioned between the other surfaces of the electrodes with the paper layers adjacent the anode and the Mylar layers adjacent the cathode.

Suitable materials for electrode foils 12 and 22 are any of the known electrostatic capacitor electrode materials, such as aluminum or lead. The preferred embodiment of this invention utilizes aluminum for the electrode foils because of the low cost and high degree of uniformity and thinness that can be obtained. Use of any conventional capacitor solder material, for example, lead-tin solder with or without aluminum, may be employed for solder terminals 18 and 28. In a like manner any of the conventional lead-wire materials may be employed for terminal leads 19 and 29, with tinned copper being the preferred material.

The low volume resistivity layers 14 and 16 of the composite dielectrics may utilize any of the materials commonly known as capacitor papers. While kraft paper is utilized in the preferred embodiment of this invention, it should be understood that other papers such as linen paper or fabricated mica paper may be employed. For the optimum results that are to be obtained in the preferred embodiment of our invention, layers 14 and 16 are of porous kraft paper to permit the absorption and wicking of a suitable impregnant into position against the surfaces of electrode 12.

Suitable impregnants for capacitance section 10 include any of the presently conventional liquid dielectric impregnants such as polyisobutylene, mineral oil, mineral wax, chlorinated diphenyl and chlorinated naphthalene, whether used alone or in conjunction with a stabilizer. Another suitable group of impregnants is the in situ polymerized impregnants that are deposited in the section in liquid form and thereafter cured to effect polymerization to a solid material, for example, n-vinyl carbozole, pentachlorostyrene, divinyl benzene. The preferred embodiment of our invention utilizes polyisobutylene as the impregnant, because of its ability to provide excellent impregnation of a tightly wound section by virtue of the wicking action in kraft layers 14 and 16.

The relatively high volume resistivity layers 24 and 26 of the composite dielectric may include many of the resin films presently popular in electrostatic capacitor constructions. These capacitor grade resin films include polyethylene terephthalate (Mylar), polyethylene, polystyrene, polycarbonates, polytetrafluoroethylene (Teflon) and polytrifluorochloroethylene (Kel-F). The preferred embodiment of this invention utilizes Mylar for layers 24 and 26 because of the availability of uniform thickness films of high continuity and freedom from holes and conducting particles.

The relationship between the high resistivity and the low resistivity layers of the composite dielectric is such that the high resistance material has a volume resistivity at least five times as great as the volume resistivity of the low resistance material. That is, with the composite dielectric rolled in the capacitor construction shown in the drawing, the voltage gradient should be at least five times as great across film 24 as across paper 16. This means that for a given voltage across a composite dielectric of this invention, 83% of the voltage should be in the gradient across film layer 24 and 17% in the gradient across paper layer 16. While the preferred lower limit has been set forth, it does not appear that there is a upper limit to the relative volume resistivities of the materials. Nor does it appear that a great deal is gained by increasing the difference in volume resistivity between the layers of the composite dielectric. For example, increasing volume resistivity of layer 24 to several hundred times the volume resistivity of layer 16 results in increase voltage gradient across layer 24 of only about 16 percent. In the preferred embodiment of this invention, Mylar having a volume resistivity of about $10^{13}$ was combined in the composite dielectric with kraft paper having a volume resistivity of about $10^{12}$.

Since the relationship between layers 16 and 24 has been set forth in the preceding paragraph in terms of voltage gradient, the relative thickness of the layers is of little importance. However, it is important that both layers be present in the composite dielectric in order to obtain the high voltage breakdown strength of Mylar and the ability of the paper to separate the anode from the high voltage gradient layer. As set forth above, the paper layer also serves the important function of ensuring complete impregnation throughout the tightly wound convolute section 10. It has been found advisable to utilize Mylar of at least 0.25 mil thickness, and to have the paper be no more than twice as thick as the resin film, and to have the resin film no more than three times the thickness of the paper layer. That is, the resin film-paper thickness ratio should be between 3:1 and 1:2 to obtain optimum results.

The following test was conducted to establish the validity and worth of the invention herein above described. Two sets of capacitors were rolled to ratings of one microfarad at 200 v. D.C. Each unit was flash tested at three times the rated voltage to ensure good test capacitors. One set of units was rolled to utilize the composite paper-Mylar dielectric of this invention in accordance with the construction shown in the drawing. The other set of units was rolled in the construction that has been described above as prior art, namely a paper layer against one face of each electrode and a Mylar film against the other face. Each of the units was subjected to life test under accelerated conditions of 125° C. temperature and three to five times rated voltage. A significantly greater number of the prior art capacitors broke down at each of the test voltage of 600, 800 and 1000 volts. Moreover, in all cases the breakdowns in the prior art constructions were at shorter times than for the constructions of this invention. Each of six test lots (of fifty units each) provided similar results of the superiority of the construction of this invention with respect to increased life. After 3000 hours of accelerated life tests an appreciably greater number of the survivors of each test lot were units that had been constructed according to the teachings of this invention.

It should be understood that although the invention described in terms of extended-foil capacitor construction it is within the scope of this invention to employ the concept in tab wound capacitor constructions, wherein foils 12 and 22 would not extend beyond the dielectric alignment shown in FIGURE 2, but would be provided with metallic tabs or risers that would extend beyond the end of section 10.

It should be understood that the above-identified embodiments of this invention are for purposes of illustration only and that modifications may be made without departing from the spirit of the invention. It is intended

What is claimed is:

1. A convolutely wound capacitance section comprising oppositely polarized anode and cathode electrodes separated throughout said section by a composite dielectric, said composite dielectric having one outer layer of an insulator material having a volume resistivity at least five times the volume resistivity of the insulator material of the other outer layer, said capacitance section so constructed and arranged that the opposed surfaces of said anode are contacted by said other outer layer, and the opposed surfaces of said cathode are contacted by said outer layer.

2. A convolutely wound capacitance section comprising an electrode polarized as an anode and an electrode polarized as a cathode and a two layer composite dielectric, the insulator material of one layer of said composite dielectric having a volume resistivity at least five times as great as the insulator material of the other layer, said section so wound that said anode is between layers of the lower resistivity material and said cathode is between layers of said greater resistivity material.

3. The capacitance section of claim 2, wherein said greater resistivity material is a resin film and said lower resistivity material is porous and impregnatable.

4. The capacitance section of claim 3, wherein said resin film is polyethylene terephthalate, and said porous and impregnatable material is paper.

References Cited in the file of this patent

UNITED STATES PATENTS

| | | |
|---|---|---|
| 1,966,163 | Clark | July 10, 1934 |
| 2,593,829 | Arledter | Apr. 22, 1952 |
| 2,740,732 | Peck et al. | Apr. 3, 1956 |
| 2,864,982 | Ruscetta et al. | Dec. 16, 1958 |
| 2,935,668 | Robinson | May 3, 1960 |